(12) United States Patent
Thompson (10) Patent No.: US 8,527,481 B2
(45) Date of Patent: Sep. 3, 2013

(54) METHODS AND SYSTEMS FOR OBTAINING AND CORRECTING AN INDEX RECORD FOR A VIRTUAL STORAGE ACCESS METHOD KEYED SEQUENTIAL DATA SET

(75) Inventor: David K. Thompson, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 12/749,244

(22) Filed: Mar. 29, 2010

(65) Prior Publication Data

US 2011/0238638 A1    Sep. 29, 2011

(51) Int. Cl.
 *G06F 7/00*    (2006.01)
(52) U.S. Cl.
 USPC .......................................... 707/696
(58) Field of Classification Search
 USPC ................................. 707/696, 741
 See application file for complete search history.

(56) References Cited

U.S. PATENT DOCUMENTS

| | | | | |
|---|---|---|---|---|
| 4,750,106 A * | 6/1988 | Aiken, Jr. | ..................... | 714/5.11 |
| 5,408,654 A | 4/1995 | Barry | ........................... | 395/600 |
| 5,517,641 A | 5/1996 | Barry et al. | .................. | 395/600 |
| 5,887,274 A | 3/1999 | Barry et al. | .................. | 707/202 |
| 6,185,569 B1 * | 2/2001 | East et al. | ............................ | 1/1 |
| 6,654,747 B1 | 11/2003 | Van Huben et al. | ............ | 707/10 |
| 7,225,206 B2 | 5/2007 | Isip, Jr. | ......................... | 707/202 |
| 7,228,309 B1 * | 6/2007 | Fisher | .................................. | 1/1 |
| 8,131,691 B1 * | 3/2012 | Nagaralu et al. | ............. | 707/696 |
| 2002/0147736 A1 | 10/2002 | Isip, Jr. | ......................... | 707/200 |
| 2003/0163560 A1 | 8/2003 | Allen et al. | ................... | 709/223 |
| 2005/0063382 A1 * | 3/2005 | Fenner | ......................... | 370/389 |
| 2006/0093109 A1 * | 5/2006 | Van Natter et al. | ...... | 379/114.01 |
| 2007/0088769 A1 | 4/2007 | Pace et al. | ..................... | 707/204 |
| 2007/0094447 A1 | 4/2007 | Matsunami et al. | ......... | 711/114 |

FOREIGN PATENT DOCUMENTS

WO    98/20419    5/1998

\* cited by examiner

*Primary Examiner* — John Breene
*Assistant Examiner* — Joshua Bullock
(74) *Attorney, Agent, or Firm* — Zilka-Kotab, PC (57) ABSTRACT

According to one embodiment, a computer program product includes a computer readable storage medium having computer readable program code embodied therewith. The code is configured to: receive an index record including descriptions of data records, and determine if the index record is valid. For a valid index record, code is configured to locate a desired index entry from the valid index record, and to retrieve a last index entry of the valid index record. Also included in the computer program product is code configured to: read all data records to be described in a corrected index record, store a key and a location for each of the read data records, sort the read data records sequentially by key, create the corrected index record for all the read data records, and store the corrected index record. Other systems, computer program products, and methods are described as well.

17 Claims, 5 Drawing Sheets

METHODS AND SYSTEMS FOR OBTAINING AND CORRECTING AN INDEX RECORD FOR A VIRTUAL STORAGE ACCESS METHOD KEYED SEQUENTIAL DATA SET

BACKGROUND

The Virtual Storage Access Method (VSAM) provides access to data stored in a number of different types of data sets. One of these types of data sets is the Keyed Sequential Data Set (KSDS). Each data record has an Extended Binary Coded Decimal Interchange Code (EBCDIC) value associated with the data record. This value is used as a key which is used to locate the data record. The key is part of each data record. Sometimes, these individual data records are placed into a record group. A high key (typically the key of the last data record stored in the record group) of a record group may then be sorted into a master group along with a plurality of other record group high keys. For each master group, an index record is created with index entries which describe the high key included in each record group. The index record is updated for many reasons, and if any of this update processing does not complete successfully, the index record may become unsynchronized with individual data record(s). This may result in data records not having a valid entry in the index record available to a processing program, thereby hindering processing and updating of the key for the data records not indexed.

Therefore, systems and methods which can account for these synchronization anomalies between the index record and individual data records referenced therein would be very beneficial to VSAM-based systems.

SUMMARY

In one embodiment, a method for correcting an index record includes receiving an initial index record having descriptions of either data records or other index records, determining that the initial index record includes descriptions of data records or descriptions of other index records and for the initial index record which includes descriptions of data records, determining that the initial index record is valid, and for the valid index record, locating a desired index entry from the valid index record, and retrieving a last index entry of the valid index record. The method also includes reading all data records to be described in a corrected index record, storing a key and a location for each of the read data records, sorting the read data records sequentially by key, creating the corrected index record for all the read data records, and storing the corrected index record. For the initial index record which includes descriptions of other index records, the method includes storing a key from a first index entry, storing an index level for a first index record in the first index entry, locating a next index record having the stored index level, storing a key for the next index record having the stored index level, storing a location for the next index record having the stored index level, locating and reading a highest level index record, locating an index record having the stored key from the first index entry, proceeding to a next index level until the stored index level is reached, determining that the index record arrived at is to be rebuilt, otherwise producing an error, retrieving a previous index record having the stored index level, retrieving a last index entry from the previous index record, initializing a high level index record to be rebuilt, retrieving a lower level index record and adding an index entry relating to the lower level index record retrieved to the high level index record to be rebuilt until no more lower level index records have the stored index level in the first index entry, and storing the high level index record.

In another embodiment, a computer program product includes a computer readable storage medium having computer readable program code embodied therewith. The computer readable program code includes computer readable program code configured to: receive an index record including descriptions of data records, and determine if the index record is valid. For a valid index record, computer readable program code is configured to locate a desired index entry from the valid index record, and to retrieve a last index entry of the valid index record. Also included is computer readable program code configured to: read all data records to be described in a corrected index record, store a key and a location for each of the read data records, sort the read data records sequentially by key, create the corrected index record for all the read data records, and store the corrected index record.

According to another embodiment, a computer program product includes a computer readable storage medium having computer readable program code embodied therewith. The computer readable program code includes computer readable program code configured to: receive an index record including descriptions of other index records, store a key from a first index entry store an index level for a first index record in the first index entry, locate a next index record having the stored index level, store a key for the next index record having the stored index level, store a location for the next index record having the stored index level, locate and read a highest level index record, locate an index record having the key from the first index entry, proceed to a next index level until the stored index level is reached, determine that the index record arrived at is to be rebuilt, otherwise producing an error, retrieve a previous index record having the stored index level in the first index entry, retrieve a last index entry from the previous index record, initialize a high level index record to be rebuilt, retrieve a lower level index record and add an index entry relating to the lower level index record retrieved to the high level index record to be rebuilt until no more lower level index records have the index level for the first index record in the first index entry, and store the high level index record.

In one more embodiment, a system includes a processor for reading all of a plurality of record groups collected in a master group, for recording a record group number and a high key for each of the plurality of record groups, the record group number and the high key being recorded on a local system, for sorting the high keys in ascending key sequence so that a sequential order of the record groups in the master group is determined, for creating an index record including index entries for each of the high keys in the ascending key sequence using the record groups associated with the high keys, and for placing any remaining record groups in a list of free record groups for later use after all index entries have been correctly formatted for the index record.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Synchronization anomalies in VSAM-based systems between an index record and individual data records referenced within the index record create problems for users trying to use the index record to locate and/or access individual data records. To solve these synchronization issues, in some embodiments, methods, computer program products, and/or systems may be provided which correct index records that do not correctly describe the data records for which they were created. In more approaches, index records may be created which properly describe all the data records for which they are created, thereby eliminating any synchronization issues.

In one general embodiment, a method for correcting an index record includes receiving an initial index record having descriptions of either data records or other index records, determining that the initial index record includes descriptions of data records or descriptions of other index records and for the initial index record which includes descriptions of data records, determining that the initial index record is valid, and for the valid index record, locating a desired index entry from the valid index record, and retrieving a last index entry of the valid index record. The method also includes reading all data records to be described in a corrected index record, storing a key and a location for each of the read data records, sorting the read data records sequentially by key, creating the corrected index record for all the read data records, and storing the corrected index record. For the initial index record which includes descriptions of other index records, the method includes storing a key from a first index entry, storing an index level for a first index record in the first index entry, locating a next index record having the stored index level, storing a key for the next index record having the stored index level, storing a location for the next index record having the stored index level, locating and reading a highest level index record, locating an index record having the stored key from the first index entry, proceeding to a next index level until the stored index level is reached, determining that the index record arrived at is to be rebuilt, otherwise producing an error, retrieving a previous index record having the stored index level, retrieving a last index entry from the previous index record, initializing a high level index record to be rebuilt, retrieving a lower level index record and adding an index entry relating to the lower level index record retrieved to the high level index record to be rebuilt until no more lower level index records have the stored index level in the first index entry, and storing the high level index record.

In another general embodiment, a computer program product includes a computer readable storage medium having computer readable program code embodied therewith. The computer readable program code includes computer readable program code configured to: receive an index record including descriptions of data records, and determine if the index record is valid. For a valid index record, computer readable program code is configured to locate a desired index entry from the valid index record, and to retrieve a last index entry of the valid index record. Also included is computer readable program code configured to: read all data records to be described in a corrected index record, store a key and a location for each of the read data records, sort the read data records sequentially by key, create the corrected index record for all the read data records, and store the corrected index record.

According to another general embodiment, a computer program product includes a computer readable storage medium having computer readable program code embodied therewith. The computer readable program code includes computer readable program code configured to: receive an index record including descriptions of other index records, store a key from a first index entry store an index level for a first index record in the first index entry, locate a next index record having the stored index level, store a key for the next index record having the stored index level, store a location for the next index record having the stored index level, locate and read a highest level index record, locate an index record having the key from the first index entry, proceed to a next index level until the stored index level is reached, determine that the index record arrived at is to be rebuilt, otherwise producing an error, retrieve a previous index record having the stored index level in the first index entry, retrieve a last index entry from the previous index record, initialize a high level index record to be rebuilt, retrieve a lower level index record and add an index entry relating to the lower level index record retrieved to the high level index record to be rebuilt until no more lower level index records have the index level for the first index record in the first index entry, and store the high level index record.

In one more general embodiment, a system includes a processor for reading all of a plurality of record groups collected in a master group, for recording a record group number and a high key for each of the plurality of record groups, the record group number and the high key being recorded on a local system, for sorting the high keys in ascending key sequence so that a sequential order of the record groups in the master group is determined, for creating an index record including index entries for each of the high keys in the ascending key sequence using the record groups associated with the high keys, and for placing any remaining record groups in a list of free record groups for later use after all index entries have been correctly formatted for the index record.

As will be appreciated by one skilled in the art, the present invention may be embodied as a system, method, or computer program product. Accordingly, the present invention may take the form of an entirely hardware embodiment, a software embodiment (including firmware, resident software, microcode, etc.) operating an apparatus or an embodiment combining software and hardware aspects that may all generally be referred to herein as a "circuit," "module" or "system." Furthermore, the present invention may take the form of a computer program product stored in any tangible medium of expression having computer-usable program code stored in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus, to produce a computer system. The computer system executes the instructions via the processor, which implements the functions/acts specified in the flowchart and/or block diagram block(s).

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
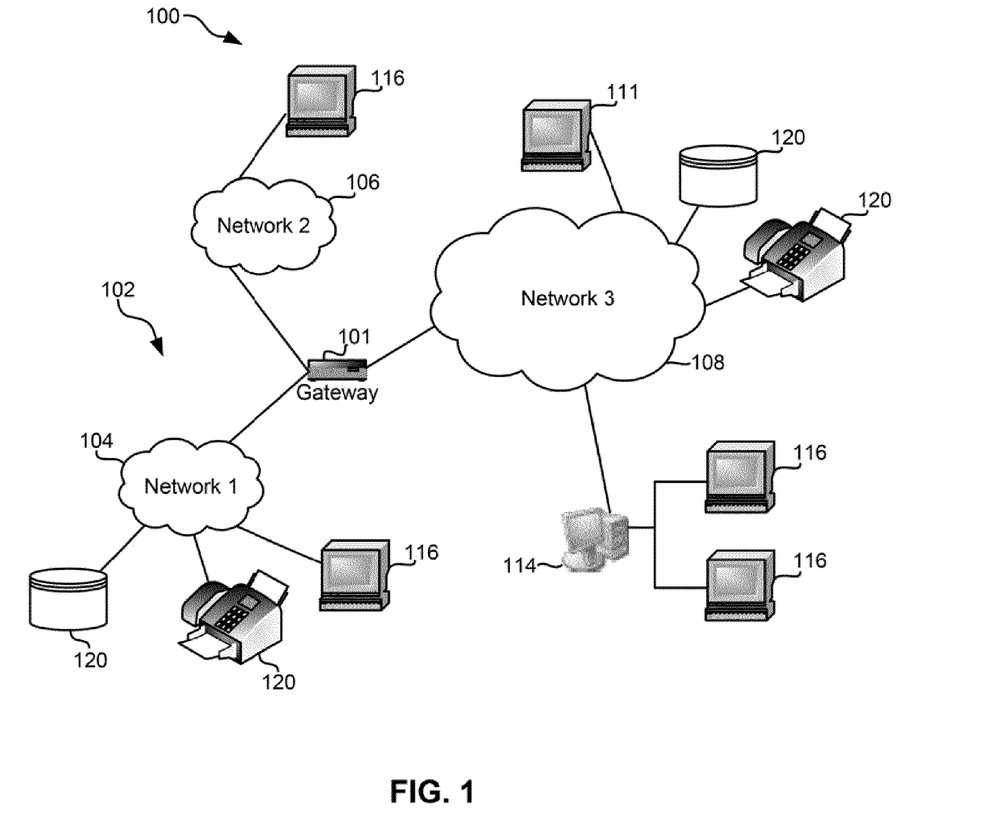
FIG. 1 illustrates a network architecture, in accordance with one embodiment.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106, 108 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
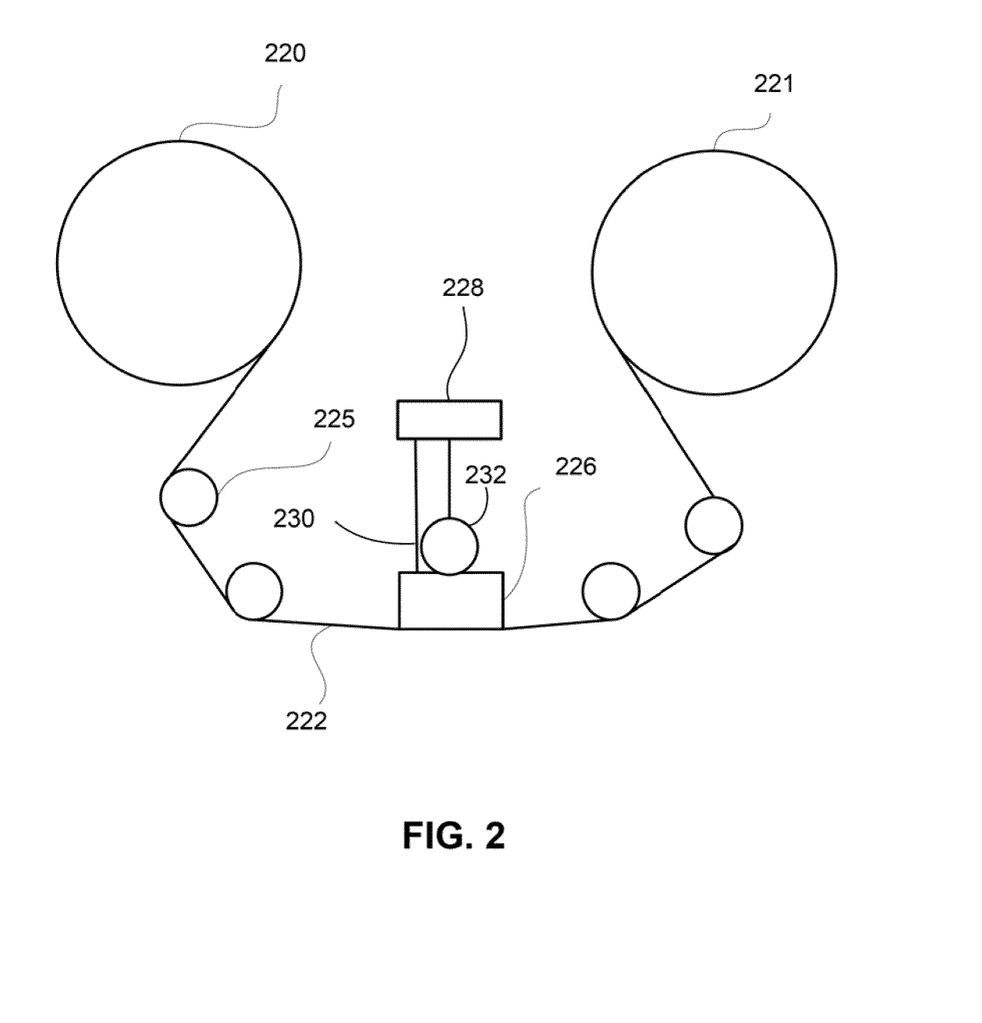
FIG. 2 is a schematic of tape drive system, in accordance with one embodiment.

FIG. 2 is a schematic diagram of a simplified tape drive system, in accordance with one embodiment, which may be a standalone unit, part of a tape library system, a peripheral 120 of FIG. 1, etc. Such a tape drive may be employed in the context of an embodiment of the present invention. While one specific implementation of a tape drive is shown in FIG. 2, it should be noted that the embodiments of the previous figures may be implemented in the context of any type of tape drive system.

As shown, a tape supply cartridge 220 and a take-up reel 221 are provided to support a tape 222. These may form part of a removable cassette and are not necessarily part of the system. Guides 225 guide the tape 222 across a preferably bidirectional tape head 226. Such tape head 226 may be a MR, GMR, TMR, spin-valve, or other type. Tape head 226 is in turn coupled to a controller assembly 228 via a connector cable 230. The controller 228, in turn, controls head functions such as servo following, write bursts, read functions, etc. An actuator 232 controls position of the head 226 relative to the tape 222.

A tape drive, such as that illustrated in FIG. 2, includes drive motor(s) to drive the tape supply cartridge 220 and the take-up reel 221 to move the tape 222 linearly over the head 226. The tape drive also includes a read/write channel to transmit data to the head 226 to be recorded on the tape 222 and to receive data read by the head 226 from the tape 222. An interface is also provided for communication between the tape drive and a host (integral or external) to send and receive the data and for controlling the operation of the tape drive and communicating the status of the tape drive to the host, all as will be understood by those of skill in the art:

In one approach, a method is provided by which a program can identify an index record to VSAM such that VSAM can correct the contents of that index record to prevent the loss of access to any data records which may or may not currently be described in the index record.

In some embodiments, the record group which stores a plurality of data records may be known as a control interval (CI). A number of these CIs may then be sorted into a higher level unit, e.g., the master group, which stores a plurality of record groups, known as a control area (CA). For the remainder of this disclosure, each structure will be used interchangeably in the descriptions. However, this is not meant to be limiting in any way, as the methods and systems described herein may be used with other file systems which do not include CIs and CAs.

In one embodiment, an index record describing a master group of data records may contain different parts, such as an index header with a specified format (in some cases, it is described in z/OS Data Facility Storage Management Subsystem (DFSMS): Using Data Sets, Document Number SC26-7410). An index record with contents which are incorrect may be detected in various ways. In one approach, these incorrect entries may be detected by using index trap logic in the VSAM Problem State I/O Driver function which prevents an incorrect index record from being written to the device. In another approach, the EXAMINE command of IBM Access Method Services may be used to determine incorrect entries in the index record. These methods only detect that an incorrect or faulty index record exists, but do nothing to correct the contents and entries of that index record.

A method that can provide the location of the index record and incorrect entries so that the processing invoked can obtain the data record that is to be described by the index record, along with correcting the index record to properly describe the data record, are two goals of embodiments described herein. According to one embodiment, a combination of using the current contents of the index record, and reading each record group (CI) to obtain the high key for the record group (CI), allows the index record to be corrected such that it includes information only about the data included in the master group (CA). This provides for significant performance improvements over restoring a Keyed Sequential Data Set (KSDS) which may contain thousands of cylinders of data or more. A master group (CA) with a size of one cylinder may include 180 record groups which may have a size of 4096 bytes each (in the case of a CI) and the index record for such a master group might have a length of 8192 bytes (in the case of a CA). These sizes are for example purposes only and are not meant to be limiting. Other sizes may also be used for the record groups and master groups, that may be larger or smaller than those described herein.

In one approach, a function to correct an index record may be invoked to create an index in which the index entries do not contain the full length key, but contain a subset of the key based on key information in previous index entries and in entries which follow. The index record may also contain index entries known as section entries which are used to search an index record using larger pieces, or sections, to quickly locate the index entry of interest. When an entry for the desired key is found, the record group (CI) is searched to find the data record which has the appropriate key. Since the last data record in a record group (CI) is easily found due to the sequential nature of the record group (CI), the high key for the record group (CI) is easily determined. It is this high key that is used to determine if the record group (CI) is the correct record group (CI) for the index entry.

If the index entry and record group (CI) do not agree, various reasons may be the cause. One such reason is that a different index entry may point to the same record group (CI) which would mean there are duplicate record groups (as) in the index record. Another possible reason is that the positioning determined within the index record may include a byte of data for the record group (CI) number. Another reason may be that the process used to split the record group (CI) failed and the index entry was created incorrectly.

According to one embodiment, index records may include index entries for data records and/or for other index records.

If the index entries describe data records, the records are in a contiguous location on a Direct Access Storage Device (DASD). The data records may be spanned records in which case the location of each segment is included in multiple index entries.

If the index entries describe other index records, the other index records are considered to be at a lower index level. All index records at any one level are chained together such that the records for ranges of keys may be used when rebuilding an index record.

In one approach, a system may include a processor. The processor may be of any type, including but not limited to a central processing unit (CPU), an application specific integrated circuit (ASIC), a field programmable gate array (FPGA), etc. The processor may perform many functions and tasks, including but not limited to reading all of a plurality of record groups collected in a master group, recording a record group number and a high key for each of the plurality of record groups, the record group number and the high key being recorded on a local system, sorting the high keys in ascending key sequence so that a sequential order of the record groups in the master group is determined, creating an index record including index entries for each of the high keys in the ascending key sequence using the record groups associated with the high keys, and placing any remaining record groups in a list of free record groups for later use after all index entries have been correctly formatted for the index record.

According to one embodiment, the index record may include an index header having a specified format. The format may be specified by z/OS DFSMS: Using Data Sets, Document Number SC26-7410, but is not so limited.

In another approach, the read data records may be sorted in an ascending key sequence. In an alternative approach, they may be sorted in a descending key sequence, or in any other desired sequence.

In a preferred embodiment, the corrected index record may include descriptions of all the read data records. In other embodiments, it may include only a portion of the read data records.

In one approach, the descriptions of all the read data records may include a key associated with each data record, a location of each data record, and at least one of: a creation date, a last modified date, a size, and a record type. Other data may also be included as desired by the user.

Figure 3A:
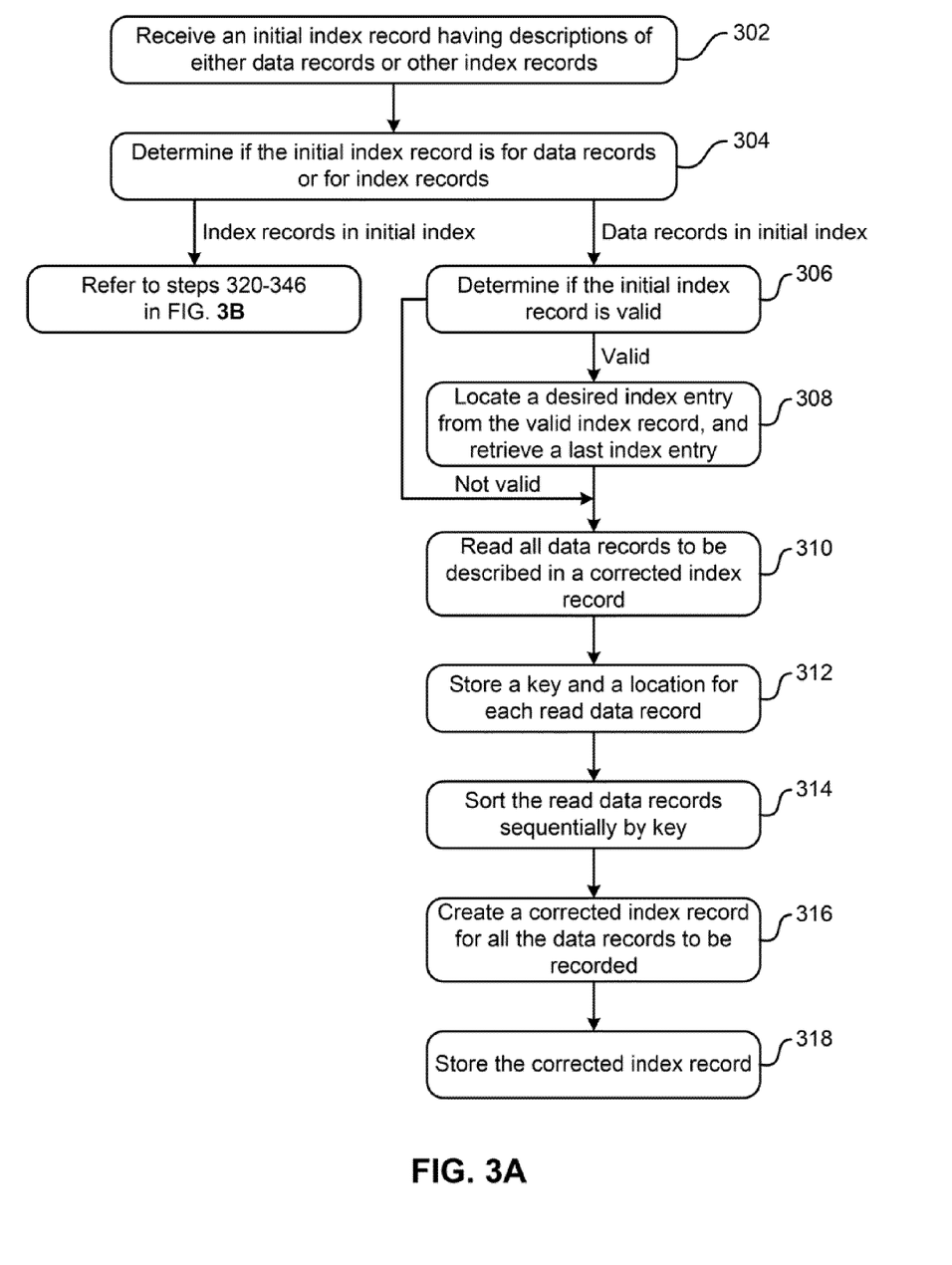
FIG. 3A shows a flow chart of a method for use with index records having descriptions of data records, according to one embodiment.
Figure 3B:
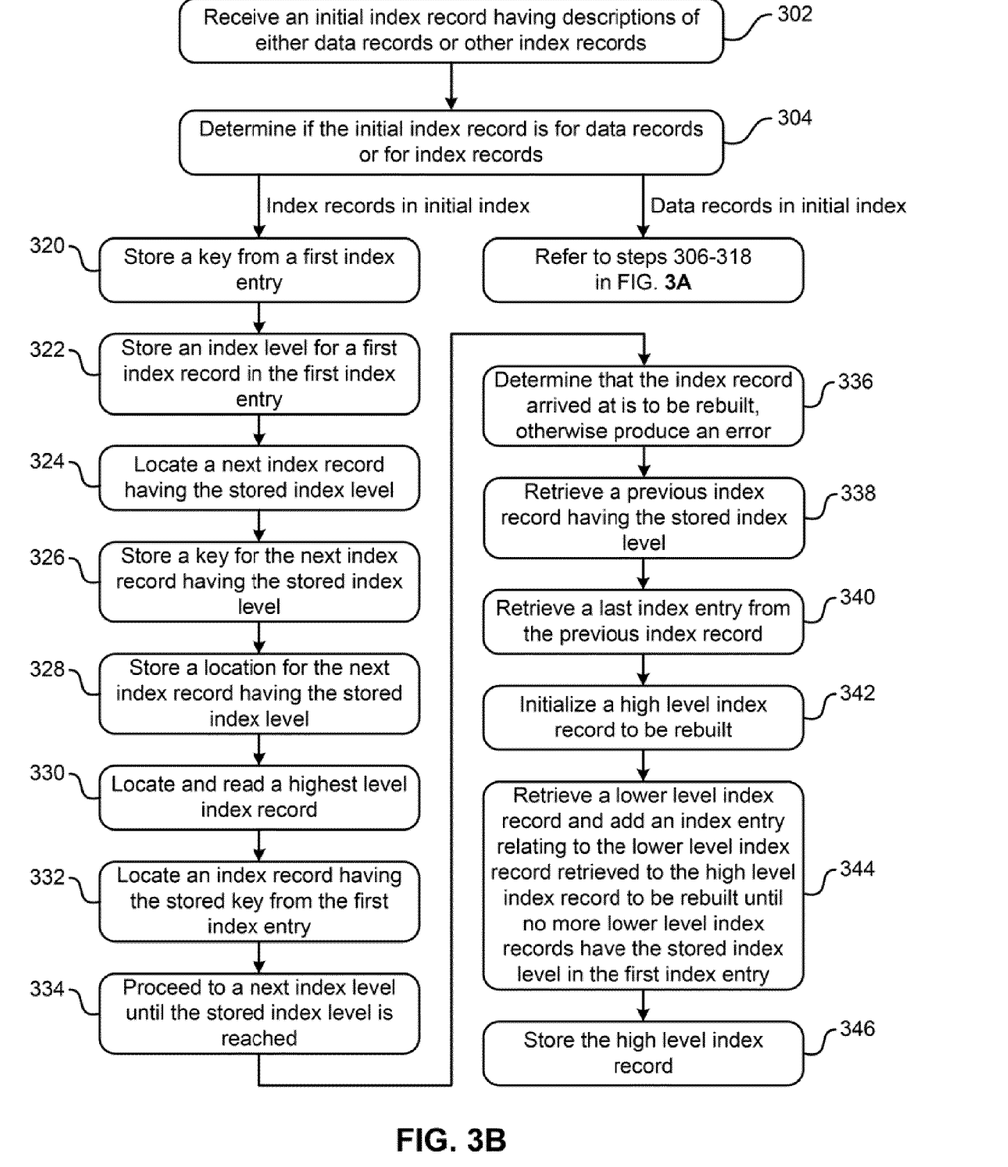
FIG. 3B shows a flow chart of a method for use with index records having descriptions of other index records, according to one embodiment.

Now referring to FIG. 3, a method 300 for correcting an index record is shown according to one embodiment. The method 300 may be executed in any desired environment, such as on a local system that has access to and/or can receive information from a remote system housing data records.

In operation 302, an initial index record is received. The index record may be received from a remote system, from a DASD, from a volume, etc. Any transmission method may be used to send and receive the index record.

In operation 304, it is determined if the initial index record includes descriptions of data records or descriptions of other index records. The determination dictates what type of processing is performed on the initial index record to correct any mistakes that may be present in the initial index record. Index records for other index records are treated differently than are index records for data records, in most approaches.

In operation 306, if the initial index record includes descriptions of data records, it is determined if the initial index record is valid.

In operation 308, if the initial index record is valid, a desired index entry is located from the valid index record and a last index entry is retrieved from the valid index record.

In operation 310, if the index record was not valid, or after operation 308 is performed, all data records to be recorded in a corrected index record are read.

In operation 312, a key and a location for each read data record are stored. This data may be stored in any accessible location such that it may be used in a later processing step. For example, this data may be stored in cache, in RAM, on a DASD, etc.

In operation 314, the read data records are sorted sequentially by key. The sorting may be in ascending or descending order, but in preferable embodiments, the sorting is in ascending order.

In operation 316, the corrected index record is created for all read data records. The corrected index record may include descriptions of the read data records, a key for each read data record, a location of each read data record, etc.

In operation 318, the corrected index record is stored. The corrected index record may be stored in any accessible location such that it may be used at a later time. For example, the corrected index record may be stored in cache on a remote system, in cache on a local system, in RAM, on a DASD, in multiple locations, etc.

If the index record includes descriptions of other index records instead of descriptions of data records, operations 320-346 are performed instead of operations 306-318.

In operation 320, a key from a first index entry is stored. This key may be stored in any accessible location such that it may be used in a later processing step. For example, this key may be stored in cache, in RAM, on a DASD, etc.

In operation 322, an index level for a first index record in the first index entry is stored. The index level is a description of how many index records describe this index level, along with how many index records are described by this index record. The index level may be found in an index header stored in the first index record. For example, if there are two lower index records described by this index record, and one upper index record describes this index record, the index level may be stored as 3, with the upper index record having an index level of 4.

In operation 324, a next index record is located having the stored index level. This operation may be performed a plurality of times until all index records at the stored index level have been located.

In operation 326, a key is stored for the next index record having the stored index level. This key may serve as the high key for the stored index level.

In operation 328, a location is stored of the next index record having the stored index level, possibly as a first entry in a high level index record. In this way, a location and a key are stored for the first index record in the high level index record, thereby providing guidance as to where the index record is located which is included in the high level index record.

In operation 330, a highest level index record is located and read.

In operation 332, an index record having the stored key from the first index entry is located.

In operation 334, a next index level is proceeded to until the stored index level is reached.

In operation 336, it is determined that the index record arrived at is to be rebuilt, otherwise an error is produced.

In operation 338, a previous index record is retrieved, the previous index record having the stored index level.

In operation 340, a last index entry from the previous index record is retrieved.

In operation 342, a high level index record to be rebuilt is initialized.

In operation 344, a lower level index record is retrieved and an index entry relating to the lower level index record retrieved is added to the high level index record to be rebuilt until no more lower level index records have the stored index level in the first index entry.

In operation 346, the high level index record is stored. The high level index record may be stored in any accessible location such that it may be used to find associated index records at a later time. For example, this key may be stored in cache, on a DASD, in RAM, etc.

Figure 4:
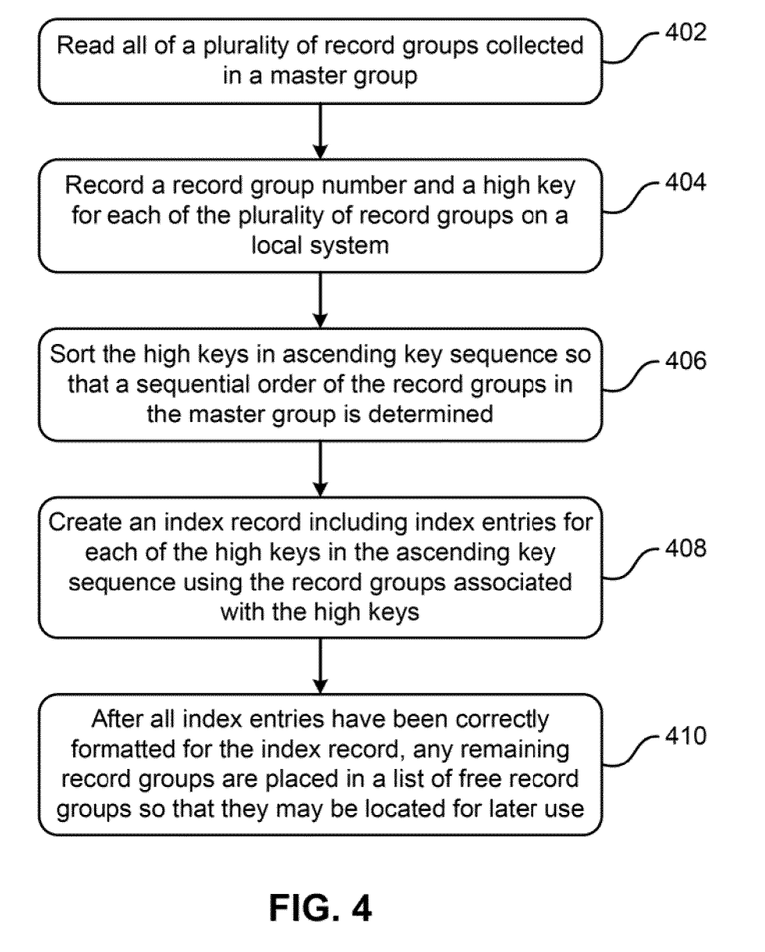
FIG. 4 shows a flow chart of a method for correcting an index record, according to one embodiment.

The problems with index records being unsynchronized with data records may be corrected by properly examining the index record and ensuring that the keys in the index record are correct for the data records to which these keys relate, in some approaches. To accomplish this, in one approach, a method 400 as shown in FIG. 4 may be used. The method 400 may be executed in any desired environment, such as on a local system that has access to and/or can receive information from a remote system housing the data records.

In operation 402, all of a plurality of record groups (CIs) collected in a master group (CA) are read.

In operation 404, a record group (CI) number and a high key for each record group (CI) is recorded on a local system.

In operation 406, the high keys are sorted in ascending key sequence so that a sequential order of the record groups (CIs) in the master group (CA) is determined.

In operation 408, an index record is created including index entries for each of the keys in the ascending key sequence using the record groups (CIs) associated with the keys.

According to one embodiment, if any data records span across one or more record groups (CIs), then a special format for the index record is used since the key is only in the first segment of a spanned data record. Therefore, if any spanned data records are encountered when reading the record groups (CIs), the record group (CI) number for the first segment of the spanned data record is found in the index record to allow the record group (CI) numbers for the remaining segments to be determined.

In operation 410, after all index entries have been correctly formatted for the index record, any remaining record groups (CIs) do not contain data. These record groups (CIs) are placed in a list of free record groups (CIs) so that they may be located for later use.

In anticipated embodiments, this process may be used with any data set structure and access method, so long as the index structure is compatible with the access method and the data set structure.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for correcting an index record, the method comprising:
    receiving an initial index record having descriptions of either data records or other index records;
    determining that the initial index record includes descriptions of data records or descriptions of other index records;
    for the initial index record which includes descriptions of data records:
        determining that the initial index record is valid;
        for the valid index record:
            locating a desired index entry from the valid index record; and
            retrieving a last index entry of the valid index record;
        reading all data records to be described in a corrected index record;
        storing a key and a location for each of the read data records;
        sorting the read data records sequentially by key;
        creating the corrected index record for all the read data records; and
        storing the corrected index record;
    for the initial index record which includes descriptions of other index records:
        storing a key from a first index entry;
        storing an index level for a first index record in the first index entry;
        locating a next index record having the stored index level;
        storing a key for the next index record having the stored index level;
        storing a location for the next index record having the stored index level;
        locating and reading a highest level index record;
        locating an index record having the stored key from the first index entry;
        proceeding to a next index level until the stored index level is reached;
        determining that the index record arrived at is to be rebuilt, otherwise producing an error;
        retrieving a previous index record having the stored index level;
        retrieving a last index entry from the previous index record;
        initializing a high level index record to be rebuilt;
        retrieving a lower level index record and adding an index entry relating to the lower level index record retrieved to the high level index record to be rebuilt until no more lower level index records have the stored index level in the first index entry; and
        storing the high level index record.

2. The method as recited in claim 1, wherein the initial index record includes an index header having a specified format.

3. The method as recited in claim 1, wherein the read data records are sorted in an ascending key sequence.

4. The method as recited in claim 1, wherein the corrected index record includes descriptions of all the read data records.

5. The method as recited in claim 1, wherein the high level index record includes descriptions of other index records.

6. The method as recited in claim 1, wherein the descriptions of all the read data records include a key associated with each data record, a location of each data record, and at least one of: a creation date, a last modified date, a size, and a record type.

7. A computer program product, comprising:
    a non-transitory computer readable storage medium having computer readable program code embodied therewith, the computer readable program code comprising:
        computer readable program code configured to receive an index record including descriptions of either data records or other index records;
        computer readable program code configured to determine that the index record includes descriptions of data records or descriptions of other index records;
        when the index record includes descriptions of data records, computer readable program code configured to:
            determine if the index record is valid, and for a valid index record:
                locate a desired index entry from the valid index record; and
                retrieve a last index entry of the valid index record;
            read all data records to be described in a corrected index record when the index record is determined to not be valid;
            store a key and a location for each of the read data records;
            sort the read data records sequentially by key;
            create the corrected index record for all the read data records; and
            store the corrected index record; and
        when the index record includes descriptions of other index records, computer readable program code configured to:
            store a key from a first index entry;
            store an index level for a first index record in the first index entry;
            locate a next index record having the stored index level;

store a key for the next index record having the stored index level;
store a location for the next index record having the stored index level;
locate and read a highest level index record;
locate an index record having the key from the first index entry;
proceed to a next index level until the stored index level is reached;
determine that the index record arrived at is to be rebuilt, otherwise producing an error;
retrieve a previous index record having the stored index level in the first index entry;
retrieve a last index entry from the previous index record;
initialize a high level index record to be rebuilt;
retrieve a lower level index record and add an index entry relating to the lower level index record retrieved to the high level index record to be rebuilt until no more lower level index records have the index level for the first index record in the first index entry; and
store the high level index record.

8. The computer program product as recited in claim 7, wherein the index record includes an index header having a specified format.

9. The computer program product as recited in claim 7, wherein the read data records are sorted in an ascending key sequence.

10. The computer program product as recited in claim 7, wherein the corrected index record includes descriptions of all the read data records.

11. The computer program product as recited in claim 7, wherein the descriptions of all the read data records include a key associated with each data record, a location of each data record, and at least one of: a creation date, a last modified date, a size, and a record type.

12. The computer program product as recited in claim 7, wherein the high level index record includes an index header having a specified format.

13. A computer program product, comprising:
a non-transitory computer readable storage medium having computer readable program code embodied therewith, the computer readable program code comprising:
computer readable program code configured to receive an index record including descriptions of other index records;
computer readable program code configured to store a key from a first index entry;
computer readable program code configured to store an index level for a first index record in the first index entry;
computer readable program code configured to locate a next index record having the stored index level;
computer readable program code configured to store a key for the next index record having the stored index level;
computer readable program code configured to store a location for the next index record having the stored index level;
computer readable program code configured to locate and read a highest level index record;
computer readable program code configured to locate an index record having the key from the first index entry;
computer readable program code configured to proceed to a next index level until the stored index level is reached;
computer readable program code configured to determine that the index record arrived at is to be rebuilt, otherwise producing an error;
computer readable program code configured to retrieve a previous index record having the stored index level in the first index entry;
computer readable program code configured to retrieve a last index entry from the previous index record;
computer readable program code configured to initialize a high level index record to be rebuilt;
computer readable program code configured to retrieve a lower level index record and add an index entry relating to the lower level index record retrieved to the high level index record to be rebuilt until no more lower level index records have the index level for the first index record in the first index entry; and
computer readable program code configured to store the high level index record.

14. The computer program product as recited in claim 13, wherein the high level index record includes an index header having a specified format.

15. The computer program product as recited in claim 13, wherein index entries stored in the high level index record are sorted in an ascending key sequence.

16. The computer program product as recited in claim 13, wherein the high level index record includes descriptions of index records therein.

17. A method, comprising:
receiving an index record including descriptions of other index records;
storing a key from a first index entry;
storing an index level for a first index record in the first index entry;
locating a next index record having the stored index level;
storing a key for the next index record having the stored index level;
storing a location for the next index record having the stored index level;
locating and read a highest level index record;
locating an index record having the key from the first index entry;
proceeding to a next index level until the stored index level is reached;
determining that the index record arrived at is to be rebuilt, otherwise producing an error;
retrieving a previous index record having the stored index level in the first index entry;
retrieving a last index entry from the previous index record;
initializing a high level index record to be rebuilt;
retrieving a lower level index record and add an index entry relating to the lower level index record retrieved to the high level index record to be rebuilt until no more lower level index records have the index level for the first index record in the first index entry; and
storing the high level index record.

* * * * *